United States Patent Office 2,849,426
Patented Aug. 26, 1958

2,849,426

TREATMENT OF CARBOXYL-CONTAINING POLYMERS

Verle A. Miller, Dover, Del., assignor to The Firestone Tire & Rubber Company, Akron, Ohio, a corporation of Ohio No Drawing. Application January 19, 1954
Serial No. 405,051

20 Claims. (Cl. 260—79.5)

This invention relates to the treatment of carboxyl-containing rubbery polymers. Two operations are involved, either of which can be carried out alone, or both of which can be carried out in the continuous overall treatment of the polymer. The initial rubbery polymer is thermoplastic, and in the first step a cross linking operation is carried out which yields a rubber-like product of high gum tensile strength, which likewise is thermoplastic. In the second step the thermoplastic product is cured. The invention includes the thermoplastic and cured products, as well as the methods.

Little work has been published on rubbery carboxyl-containing polymers. ("Polymers" as used herein refers generally to high molecular weight polymerization products of either one or more monomers.) In the carboxyl-containing polymers to which this invention relates the carboxyl groups are pendent, i. e., hang from the main polymer chains, and these polymers are to be distinguished from polymers in which a carboxyl group is reacted with an amine or the like (as, for example, in nylon), to become an integral part of the main polymer chain. The carboxyl groups of the polymers to which this invention relates are free and may be reacted with bases and amines, as will be more particularly described in what follows.

The preferred rubbery polymers are produced by copolymerizing at least one conjugated diene with one or more ethylenically unsaturated monomer including at least one carboxyl-containing monomer. The carboxylic acid monomers from which the polymers of the invention are formed include any unsaturated acid which can be copolymerized with a diene. These acids preferably have a terminal

group. They include acrylic acid and the higher homologues thereof, such as methacrylic acid, ethacrylic acid, propyl acrylic acid, isopropyl acrylic acid; as well as other α-substituted acrylic acids, such as α-chloro-, α-cyano-, α-sulfo-, α-phenyl-, α-furyl-, α-thienyl- and α-vinyl acrylic acids. α-Methylene dicarboxylic acids, such as itaconic acid, and their monoesters are also included. β-Substituted unsaturated acids can also be used, although, as is well known, copolymerization with a diene of monomer containing this type of structure generally is greatly retarded. Examples of this type of unsaturated acid include crotonic acid, maleic or fumaric acids, or their monoesters, and sorbic acid.

In general, the carboxylic acids from which the polymers of this invention are formed are represented by the formula R—CH=CY—(Z)$_x$—COOH in which R is preferably hydrogen, but can be carboxyl, a carboxylic ester, alkyl or alkenyl, Y is hydrogen, halogen, cyano, sulfo, alkyl, aryl, thienyl or furyl, x is zero or any whole number and is preferably no more than 3, and Z is a methylene or a substituted methylene group or an arylene, thienylene or furylene divalent cyclic radical, which can be substituted by alkyl groups. Examples of suitable carboxyl-containing monomers are the following:

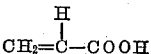

Acrylic acid and its α-substituted products

or

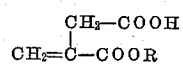

Itaconic acid, its homologues, and their monoesters

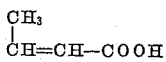

Crotonic acid and its homologues

Maleic or fumaric acids and their monoesters

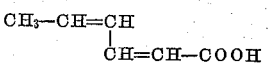

Sorbic acid and its homologues

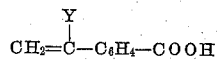

Vinylbenzoic acids and their substitution products
Vinylnaphthoic acids and their substitution products
Vinyl furoic acids and their substitution products
Vinylthiophenic acids and their substitution products In addition, this invention covers polymers containing free carboxyl groups which are obtained by copolymerizing with a diene a monomer containing a functional group capable of being hydrolyzed to a carboxyl group and which has been so hydrolyzed subsequent to polymerization. In this case the diene is preferably a butadiene-1,3 hydrocarbon. The monomers containing suitable functional groups include the unsaturated nitriles (e. g. acrylonitrile), esters (e. g., an alkyl acrylate or alkacrylate), amides (e. g., acrylamide), all of which, after polymerization, can be readily hydrolyzed to yield free carboxyl groups in the polymers.

Copolymers of dienes with acidic monomers can be prepared in widely varying proportions. However, as more of the acidic monomer is used, the properties of the polymers change from those of an elastomer to those of a plastic. The polymers of this invention, which include only those that are rubber-like in character, are composed of no more than 13.6 mole percent of the carboxylic acid monomer.

In producing a preferred polymer the acid is preferably copolymerized with any suitable diene or mixture of dienes. If desired, a mixture of monomers can be employed; such mixture can include, in addition to the diene and carboxylic acid, any vinyl monomer which will copolymerize with them. The following serve as examples of some of the polymers used in the practice of this invention. All proportions as given are percent by weight.

95 butadiene, 5 methacrylic acid
85 butadiene, 15 methacrylic acid
85 butadiene, 15 acrylic acid
90 butadiene, 10 fumaric acid
90 butadiene, 10 crotonic acid
90 butadiene, 10 itaconic acid
95 butadiene, 5 p-vinylbenzoic acid
70 butadiene, 25 styrene, 5 p-vinylbenzoic acid
67.5 butadiene, 22.5 styrene, 10 p-vinylbenzoic acid
70 butadiene, 25 styrene, 5 methacrylic acid
70 butadiene, 25 acrylonitrile, 5 methacrylic acid 35 butadiene, 62 acrylonitrile, 3 methacrylic acid
90 isoprene, 10 methacrylic acid
95 isoprene, 5 methacrylic acid
70 butadiene, 25 methyl methacrylate, 5 methacrylic acid
70 butadiene, 25 butyl methacrylate, 5 methacrylic acid
70 butadiene, 25 octyl methacrylate, 5 methacryic acid
70 butadiene, 25 lauryl methacrylate, 5 methacrylic acid
70 butadiene, 20 methyl methacrylate, 10 methacrylic acid
70 butadiene, 20 octyl methacrylate, 10 methacrylic acid The limitation of the invention to polymers containing no more than 13.6 mole percent of carboxyl-containing monomers is meant to apply strictly to monomers containing only one carboxyl group per molecule. The limitation for monomers containing two free carboxyl groups is one-half the given value or 6.8 mole percent. As an illustration of how the limitation can be expressed in another manner, the carboxyl content of a butadiene/methacrylic acid copolymer containing 13.6 mole percent of the acid is 10.5 weight percent of carboxyl group or 0.233 equivalent of —COOH per 100 parts of the rubbery polymer. An example of a suitable polymer containing approximately the practical minimum amount of carboxyl group is a copolymer of 99 parts of butadiene-1,3 and 1 part of methacrylic acid; this polymer contains 0.63 mole percent of the carboxyl-containing monomer or 0.523 weight percent of carboxyl group or 0.0116 equivalent of —COOH per 100 parts of the rubbery polymer.

Other rubbery polymers containing free carboxyl groups in the range indicated in the preceding paragraph are suitable in the practice of the invention. For example, a rubbery polymer not containing a free carboxyl group can be reacted with an appropriate reagent to add one or more carboxyl groups to the rubbery molecule. A rubbery polymer of a butadiene-1,3 hydrocarbon can be reacted with a carboxyl supplying agent such as maleic acid or a mercaptocarboxylic acid such as thioglycollic acid or anhydride thereof, thereby to produce a plastic rubbery polymer containing combined but freely reactive carboxyl groups.

The synthetic rubbers which have come into commercial use have been disappointing because of their low gum tensile strengths. (Gum tensile strength is the tensile strength of an unloaded vulcanizate.) Thus samples of polybutadiene, polyisoprene, 70/30 butadiene/styrene, 70/30 butadiene/acrylonitrile, 70/30 butadiene/methyl-, butyl-, octyl-, or lauryl-methacrylate, when compounded and cured in a typical gum formula give gum tensile strengths of only 100–250 p. s. i. In contrast, vulcanizates of high gum tensile strength are produced from the polymers in accordance with this invention by cross-linking the carboxyl groups with a polybasic salt-forming compound such as a metal oxide or amine. Table I gives comparisons of various polymers.

TABLE I.—CROSS-LINKING OF BUTADIENE/METHACRYLIC ACID COPOLYMERS WITH ZINC OXIDE ALONE

[All samples heated at 280° C.]

| | ZnO | Sulfur | Cured in minutes | Tensile strength, p. s. i. | Rebound (percent) at 22° C. |
|---|---|---|---|---|---|
| 95/5 butadiene/methacrylic acid | 5 | 0 | 30 | 1,025 | 80 |
| 90/10 butadiene/methacrylic acid | 10 | 0 | 60 | 1,775 | |
| GR-S or polybutadiene | 5 | 0 | 60 | No cure. | |

The strength and toughness of these polymers increased as larger amounts of the acid were incorporated. A further characteristic of these polymers containing small amounts of carboxyl groups when cross-linked with metallic oxides was the marked improvement in their rebound. Thus, the 95/5 butadiene-methacrylic acid copolymer had a gum rebound at 22° C. of 80–85% as compared with 62% for vulcanized polybutadiene, which was polymerized and cured in the same recipe (and 74% for natural rubber in a gum recipe.) Table II shows results of curing with sulfur.

TABLE II.—GUM TENSILE STRENGTH OF CARBOXYL-CONTAINING POLYMERS

[Compounding recipe: Polymer 100, ZnO, (or equivalent of other metallic oxides), accelerator 1.2, sulfur 1 or 2, stearic acid 1.]

| Polymer | Metallic oxide | Sulfur | Tensile strength (p. s. i.) | Rebound (percent) at 22° C. |
|---|---|---|---|---|
| Polybutadiene | 5ZnO | 2 | 100 | 62 |
| Do | 4.6Ca(OH)₂ | 2 | 150 | |
| 95/5 butadiene/methacrylic acid | 5ZnO | 2 | 600 | 80 |
| Do | 4.6Ca(OH)₂ | 1 | 1,950 | 85 |
| 90/10 butadiene/methacrylic acid | 4.6Ca(OH)₂ | 1 | 3,025 | |
| 85/15 butadiene/methacrylic acid | 4.6Ca(OH)₂ | 2 | 3,450 | |
| Do | 5ZnO | 1 | 2,250 | |
| 90/10 butadiene/fumaric acid | 5ZnO | 2 | 450 | |
| Do | 4.6Ca(OH)₂ | 1 | 675 | 66 |
| 90/10 butadiene/crotonic acid | 4.6Ca(OH)₂ | 1 | 400 | 61 |
| 90/10 butadiene/itaconic acid | 4.6Ca(OH)₂ | 1 | 525 | 73 |
| 90/10 butadiene/acrylic acid | 4.6Ca(OH)₂ | 1 | 1,400 | 72 |
| 95/5 butadiene/p-vinylbenzoic acid | 4.6Ca(OH)₂ | 1 | 1,625 | 88 |
| Polyisoprene | 4.6Ca(OH)₂ | 2 | 150 | 59 |
| 95/5 isoprene/methacrylic acid | 4.6Ca(OH)₂ | 2 | 3,150 | 71 |
| 70/30 butadiene/styrene | 4.6Ca(OH)₂ | 2 | 125 | 69 |
| 70/25/5 butadiene/styrene/methacrylic acid | 4.6Ca(OH)₂ | 1 | 2,525 | 75 |
| 70/25/5 butadiene/styrene/p-vinylbenzoic acid | 4.6Ca(OH)₂ | 1 | 2,750 | 83 |
| 70/30 butadiene/acrylonitrile | 4.6Ca(OH)₂ | 2 | 250 | 47 |
| 70/25/5 butadiene/acrylonitrile/methacrylic acid | 4.6Ca(OH)₂ | 2 | 2,850 | 45 |
| 35/65 butadiene/acrylonitrile | 4.6Ca(OH)₂ | 2 | 900 | |
| 35/64/1 butadiene/acrylonitrile/methacrylic acid | 4.6Ca(OH)₂ | 2 | 2,950 | |
| 35/62/3 butadiene/acrylonitrile/methacrylic acid | 4.6Ca(OH)₂ | 2 | 3,075 | |
| 70/30 butadiene/methyl methacrylate | 4.6Ca(OH)₂ | 2 | 150 | 70 |
| 70/25/5 butadiene/methyl methacrylate/methacrylic acid | 4.6Ca(OH)₂ | 1 | 3,300 | 70 |
| 70/30 butadiene/butyl methacrylate | 4.6Ca(OH)₂ | 2 | 125 | 77 |
| 70/25/5 butadiene/butyl methacrylate/methacrylic acid | 4.6Ca(OH)₂ | 1 | 2,800 | 80 |
| 70/20/10 butadiene/butyl methacrylate/methacrylic acid | 4.6Ca(OH)₂ | 1 | 3,800 | |
| 70/30 butadiene/octyl methacrylate | 4.6Ca(OH)₂ | 2 | 125 | 72 |
| 70/25/5 butadiene/octyl methacrylate/methacrylic acid | 4.6Ca(OH)₂ | 1 | 2,250 | 81 |
| 70/20/10 butadiene/octyl methacrylate/methacrylic acid | 4.6Ca(OH)₂ | 1 | 3,575 | |
| 70/30 butadiene/lauryl methacrylate | 4.6Ca(OH)₂ | 2 | 125 | 73 |
| 70/25/5 butadiene/lauryl methacrylate/methacrylic acid | 4.6Ca(OH)₂ | 1 | 1,050 | 81 |
| 70/20/10 butadiene/lauryl methacrylate/methacrylic acid | 4.6Ca(OH)₂ | 1 | 2,075 | |

That this improved strength and rebound was predominantly due to the reaction of these polymers with a metallic oxide to form a salt linkage between two pendant carboxyl groups was proven when a tensile strength of 1025 p. s. i. and a rebound at 22° C. of 80% was obtained with a 95/5 butadiene/methacrylic acid copolymer by cross-linking it with zinc oxide in the absence of sulfur under conditions which gave no cure at all with essentially carboxyl-free polymers such as polybutadiene or GR–S. These polymer salts were still thermoplastic even though they were sufficiently cross-linked to exhibit high tensile strength and rebound; these polymer salts would still flow under heat and pressure to give smooth well-molded or extruded samples. This is in contrast to the normal sulfur vulcanization of rubbers wherein high tensile strength is accompanied by a loss in thermoplasticity. This thermoplasticity was no longer evident in metallic oxide cross-linked samples which were also subjected to a small amount of sulfur vulcanization.

A preferred vulcanizate is formed by first cross-linking the carboxyl groups with calcium hydroxide, and then vulcanizing the resulting product with sulfur. Instead of calcium hydroxide, calcium oxide can be used, or the oxide or hydroxide of other basic polyvalent metals, viz., barium, strontium, divalent tin, divalent copper, divalent nickel, zinc, divalent lead, magnesium, divalent mercury, cadmium and beryllium. Mixtures of these oxides or hydroxides can be employed to modify the properties of the resulting thermoplastic composition or the final vulcanizate.

Instead of using metal oxides or hydroxides, polyamines can be employed. The amines must contain at least two amino groups which will react with a carboxyl group in order to produce a cross linkage. Examples of the more basic primary, secondary, or tertiary aliphatic or heterocyclic polyamines which can be used include ethylene diamine, 1,3-diaminobutane, diethylenetriamine, triethylenetetramine, tetraethylenepentamine, tetramethylenediamine, trimethylenediamine, aminoethylethanolamine, diamylaminopropylamine, and aminoethylmorpholine; it is noted that the ionization constants of these amines are equal to or greater than the constant for ammonia. The less basic aromatic amines such as ortho- or para-phenylenediamine did not appreciably crosslink these polymers. As will be discussed more fully in a later section of the disclosure, the properties of the final product vary considerably according to the amount of the salt-forming compound used, and useful products are obtained in which all or a part of the carboxyl groups have undergone reaction.

As an example of cross-linking a carboxyl-containing elastomer with a diamine according to this invention, the following experiment is given.

*Example 1.*—Ethylene diamine (3.7 or 7.4 parts per 100 of polymer) was added in a dropwise manner to samples of a butadiene/methacrylic acid copolymer (containing 13.6 mole percent of methacrylic acid) on a water-cooled mill. These amounts are molecularly equivalent to 5 or 10 parts of zinc oxide and represent 50 or 100% of the amount theoretically required to react with all of the carboxyl groups present in the polymer. The milled products became progressively stiffer as more of the diamine was added. This amine-compounded material was thermoplastic and flowed readily with heat and pressure to give a smooth, tough sheet that had good strength. This product changed very little after being immersed in methyl ethyl ketone over night, whereas the raw polymer swelled considerably and partially dissolved. Samples of these amine-compounded materials, as well as the raw polymer which was given similar milling treatment, were molded into slabs and heated for 30 minutes at varying temperatures. Their stress-strain data are presented in Table III.

TABLE III.—CROSS-LINKING WITH ETHYLENE DIAMINE OF BUTADIENE-METHACRYLIC ACID COPOLYMER

| Sample heated 30 minutes at— | Percent elongation | Modulus at 300% in p. s. i. | Tensile strength (p. s. i.) |
|---|---|---|---|
| ZERO ETHYLENEDIAMINE | | | |
| 110° C | 700 | 25 | 25 |
| 127° C | 940 | 25 | 250 |
| 138° C | 960 | 25 | 225 |
| 154° C | 820 | 25 | 150 |
| 3.7 PARTS ETHYLENEDIAMINE | | | |
| 110° C | 520 | 525 | 1,650 |
| 127° C | 540 | 575 | 1,900 |
| 133° C | 520 | 550 | 1,725 |
| 154° C | 540 | 575 | 1,700 |
| 7.4 PARTS ETHYLENEDIAMINE | | | |
| 110° C | 440 | 1,125 | 2,150 |
| 127° C | 540 | 1,300 | 3,325 |
| 138° C | 540 | 1,125 | 3,375 |
| 154° C | 560 | 1,075 | 3,275 |

Although considerable evidence of cross-linking was obtained without subsequent heating, the optimum values were obtained after heating for 30 minutes at 127° C. and higher. Elongations of 540% and tensile strengths of 1900 and 3325 p. s. i. were obtained, respectively, with the samples to which 3.7 and 7.4 parts of ethylenediamine had been added. As was observed with the copolymers cross-linked with metallic oxides, these materials were thermoplastic below the temperature at which sulfur vulcanization occurs, and thus a combination of crosslinking reactions can be used without affecting their processibility.

A mixture of a polyamine and a metallic oxide or hydroxide can be used in order to obtain desirable modifications in the properties of the first product. For example, replacement of zinc oxide by diaminobutane or diethylenetriamine and use of these amines in combination with zinc oxide in a tire tread stock from an 85/15 butadiene/methacrylic acid copolymer improved the elongation and tensile strength. Table IV shows the results obtained in a recipe using 100 parts of the polymer, 40 carbon black, 15 dibutyl phthalate (softener), 2 antioxidant, 2 stearic acid and 1.2 accelerator.

TABLE IV.—POLYAMINES WITH AND WITHOUT ZINC OXIDE IN 85/15 BUTADIENE/METHACRYLIC ACID TREAD STOCK

| | Stocks | | | | | |
|---|---|---|---|---|---|---|
| | A | B | C | D | E | F |
| Cross-linking agents: | | | | | | |
| Zinc oxide | 2.6 | | 2.6 | | 2.6 | |
| 1,3-diaminobutane | | 2.6 | 2.6 | | | |
| Diethylenetriamine | | | | 3.0 | 3.0 | 6.0 |
| Physical properties— | | | | | | |
| Cured at 280° F.: | | | | | | |
| Modulus at 200% (p. s. i.)— | | | | | | |
| 20 minutes | 575 | 200 | 800 | 250 | 850 | 300 |
| 40 minutes | | 225 | 1,050 | 275 | 1,100 | 250 |
| 80 minutes | | 300 | 1,200 | 325 | 1,425 | 350 |
| 120 minutes | | 350 | 1,150 | 375 | 1,325 | 325 |
| Modulus at 300%— | | | | | | |
| 20 minutes | 1,425 | 400 | 1,600 | 500 | 1,825 | 600 |
| 40 minutes | | 525 | 2,000 | 650 | | 525 |
| 80 minutes | | 750 | 2,300 | 725 | | 700 |
| 120 minutes | | 875 | 2,300 | 800 | | 650 |
| Tensile at break (p. s. i.)— | | | | | | |
| 20 minutes | 1,925 | 1,550 | 2,350 | 2,300 | 1,900 | 2,250 |
| 40 minutes | 1,000 | 2,150 | 2,000 | 1,925 | 1,800 | 2,150 |
| 80 minutes | 850 | 1,350 | 2,500 | 1,275 | 2,000 | 1,500 |
| 120 minutes | 675 | 1,175 | 2,300 | 1,475 | 2,250 | 2,150 |
| Percent elongation at break— | | | | | | |
| 20 minutes | 340 | 560 | 370 | 630 | 350 | 620 |
| 40 minutes | 170 | 550 | 290 | 500 | 250 | 615 |
| 80 minutes | 150 | 400 | 310 | 400 | 240 | 470 |
| 120 minutes | 100 | 340 | 300 | 390 | 240 | 580 |

The reaction of a polyamine or a metal oxide or hydroxide with the carboxyl groups is exceedingly rapid. Considerable heat is generated. The reaction can be slowed down, if desired, if instead of using one of the foregoing bases one employs the salt of a weak acid with a polyvalent metal instead of its oxide or hydroxide. Thus, when polyvalent metal salts of a weak acid are added to the free acid polymer, the metal ion of the weak acid undergoes an exchange reaction with the free acid groups in the polymer, and the latter is thereby cross-linked. In this manner certain metal cross-links, such as aluminum, nickel, chromium, manganese and tin can easily be obtained, whereas they are difficult to produce by direct reaction of the acidic metal oxides with the free acid polymer. Salts which have been successfully used in this method of cross-linking the carboxyl-containing polymers include the polyvalent metal salts of carbonic, acetic, stearic, lauric, abietic, hypochlorous, silicic, chromic, 2-ethyl-butyric and 2-ethylhexoic acids. Salts of catechol also were effective. Representative of this type of cross-linking were results of tests made on an 85/15 butadiene-1,3/methacrylic acid copolymer in the recipe: polymer 100, sulfur 1, accelerator 1.2, stearic acid 1, salt variable. The data are shown in Table V. The amount of salt is chosen to be equivalent to 5 parts of zinc oxide per 100 parts of polymer.

TABLE V.—CROSS-LINKING WITH METALLIC SALTS

| Metallic salt | Amount of salt | 200% modulus (p. s. i.) | Tensile strength (p. s. i.) | Percent elongation |
|---|---|---|---|---|
| Zinc stearate | 38.9 | 300 | 2,050 | 600 |
| Zinc laurate | 16.4 | 275 | 1,625 | 510 |
| Zinc abietate | 41.3 | 700 | 2,150 | 450 |
| Calcium hypochlorite | 13.3 | 1,000 | 2,525 | 380 |
| Lead silicate | 17.5 | 925 | 3,475 | 425 |
| Stannous catecholate | 14.1 | 375 | 2,300 | 590 |
| Aluminum stearate | 36.1 | 1,800 | 1,925 | 220 |
| Chromium stearate | 37.7 | 600 | 1,700 | 480 |
| Manganese resinate | 40.7 | 550 | 1,600 | 440 |
| Nickel resinate | 40.8 | 550 | 1,425 | 430 |

Amine salts of weak acids are also excellent cross-linking agents in the process of the invention. By this is meant the salts of any of the polyfunctional amines mentioned above, with any of the weakly acidic substances mentioned above. Specific, and excellent, examples are diethylenetriamine mono-2-ethylbutyrate and the triethylenetetramine salt of 2-ethylhexoic acid.

*Preparation of preferred polymers*

It has been indicated that the preferred polymers containing carboxyl groups are produced by copolymerizing a conjugated diene and an unsaturated carboxyl-containing monomer. Although the polymers can often be produced in solution, they are preferably prepared by emulsion polymerization. Either positively or negatively charged latices can be produced, as desired, by the proper choice of emulsification system. Positively charged latices can be obtained by the use of any of a number of known cationic emulsifiers such as the salts of dodecylamine or N-diethylaminopropyloleamide; or emulsifiers of the quaternary ammonium type, such as cetyl pyridinium chloride. An example of a recipe yielding a positive, acid latex is the following, in which parts are by weight:

ACID POLYMERIZATION RECIPE

| | |
|---|---|
| Butadiene-1,3 | 95 |
| Methacrylic acid | 5 |
| Water | 200 |
| Cationic Amine 220 [1] | 7.5 |
| Concentrated hydrochloric acid | 3.69 |
| Potassium persulfate | 0.5 |
| n-Dodecyl mercaptan | 0.8 |

[1] Cationic Amine 220 is a commercial emulsifier manufactured by Carbide & Carbon Chemicals Company and is identified as 1-hydroxyethyl-2-heptadecenyl glyoxalidine.

Negatively charged latices of the carboxyl-containing polymers can be produced by the use of anionic emulsifiers. Successful polymerizations have been conducted with a large number of this type of emulsifier in acidic systems. The last statement is not meant as a limitation to acid systems but is mentioned since salts of many acidic monomers have not truly copolymerized with dienes in alkaline media. Examples of suitable anionic emulsifiers include the sodium alkylsulfonates, a wide variety of available commercial sodium alkylarylsulfonates of both the benzene and naphthalene types, aralkyl polyether sulfonates, sulfated alcohols and sulfated monoglycerides.

Another suitable preparation of the preferred carboxyl-containing polymers makes use of the emulsifier-free polymerization technique as exemplified by the following recipe:

EMULSIFIER-FREE POLYMERIZATION RECIPE

| | |
|---|---|
| Butadiene-1,3 | 90 |
| Methacrylic acid | 10 |
| Water | 200 |
| Potassium persulfate | 2 |
| Sodium bisulfite | 2 |
| n-Dodecyl mercaptan | 0.8 |

*Cross-linking with metallic oxides and hydroxides*

The polyvalent metallic oxide or hydroxide reacts vigorously with the carboxyl groups of the rubbery polymers, and precautions will ordinarily be taken to prevent the reaction from taking place too vigorously. It is customary to add the oxide or hydroxide to a bank of the polymer on a rubber mill or in a banbury mixer. It is added slowly and is rapidly dispersed throughout the mass by the action of the mill.

If the copolymer salt is to be cured eventually it will ordinarily be advantageous to mix with the polymer the various vulcanizing ingredients, pigments and other fillers, etc. before adding the metallic base. The compounding of these various ingredients, except the metallic base, will advantageously be carried out at an elevated temperature and this can be done most conveniently on a rubber mill or in a banbury mixer. The milled mixture will then ordinarily be cooled before the metallic base is added. This addition is advantageously made while the material is being worked on a cool rubber mill. Care should be taken not to produce any high local concentrations of the metallic base in the milled mixture in order to avoid crumbling of the highly cross-linked polymer.

*Neutralization by amines or salts of weak acids*

In general, in order to realize maximum properties it is necessary to add sufficient cross-linking agent to the polymer containing carboxyl groups to react with all of the carboxyl groups present. Smaller amounts of cross-linking agent yield lower physical properties. Higher amounts yield very little increase in properties. Often the use of polyamines and/or polyvalent metal salts of weak acids results in a softer cross-linked stock, possibly because of a plasticizing effect of the hydrocarbon portions of these cross-linking agents.

Fillers and rubber pigments, including the various carbon blacks stiffen and/or reinforce vulcanized, cross-linked carboxyl-containing polymers, and are useful therein in much the same manner as they are in GR-S, although carbon black is not so necessary in the products of this invention because of the high properties flowing from the cross-linking processes of the invention.

In general, the strength, toughness and wear ratings of the vulcanized, cross-linked polymers increase as one increases the carboxyl content of the initial polymer. The introduction of only small amounts of methacrylic acid in the polymer markedly raises the gum tensile strength and rebound of the vulcanizate over that obtained with polybutadiene or the butadiene-styrene copolymer known as GR-S. Much of the cold temperature resistance characteristic of polybutadiene is retained. For tire treads, products containing about 10 to 15 percent methacrylic acid will be most valuable, although the addition of as little as 1.0 percent of methacrylic acid to butadiene-1,3 gives a marked improvement in the gum tensile strength of the product as compared with the gum tensile strength of the vulcanizate of polybutadiene containing no carboxylic acid. Polymers lose some of their resemblance to rubber when over 15 parts of methacrylic acid or a like acid are added, although products containing as much as 13.6 mole percent of the acid are rubber-like to some degree. Vulcanizates having different properties are obtained by using different metallic bases and different amines.

Sulfur curing

In order to fix the good physical properties resulting from cross-linking the carboxyl-containing polymer, and in order to overcome the thermoplasticity of the cross-linked polymer, it is necessary to sulfur-cure the cross-linked polymer. The discussions above bring out the fact that the ionic cross-linking of the invention occurs readily and rapidly upon mixing a cross-linking agent with the carboxyl-containing polymer. Because the cross-linked polymer is relatively stiff, it is usually desirable to mix sulfur curing ingredients into the polymer before cross-linking it. Ordinarily free sulfur is mixed into the polymer and the mix, after inclusion of cross-linking agent and shaping, is heated in order to cure or vulcanize the rubber. Unlike natural rubber and the various synthetic rubbers produced in U. S. Government plants, no organic accelerator is absolutely necessary to produce good cures of the carboxyl-containing rubbers.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e. g. N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N-dialkyl-dithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylenedithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra accelerator by allowing the film to remain at room temperature for several hours or a few days.

What is claimed is:

1. A sulfur-vulcanized carboxyl-containing rubbery polymer of a conjugated diene and an ethylenically unsaturated monomer ionically cross-linked by a polyfunctional reagent of the group consisting of polyvalent metal oxides, polyvalent metal hydroxides, polyvalent metal salts of weak acids, polyamines and polyamine salts of weak acids characterized by a high gum tensile strength, excellent resistance to abrasion and good low temperature properties.

2. A sulfur-vulcanized rubbery polymer of a conjugated diene and an ethylenically unsaturated monomer, the polymer containing carboxyl groups ionically cross-linked by a polyvalent metal oxide.

3. A sulfur-vulcanized rubbery polymer of a conjugated diene and an ethylenically unsaturated monomer, the polymer containing carboxyl groups ionically cross-linked by a polyamine.

4. A sulfur-vulcanized rubbery polymer of a conjugated diene and an ethylenically unsaturated monomer, the polymer containing carboxyl groups ionically cross-linked by a polyvalent metal salt of a weak acid.

5. Method of cross-linking and curing a carboxyl-containing, rubbery polymer of a conjugated diene and an ethylenically unsaturated monomer, including contacting the polymer with a poly-functional reagent of the group consisting of polyvalent metal oxides, polyvalent metal hydroxides, polyvalent metal salts of weak acids, polyamines and polyamine salts of weak acids, and sulfur-curing the cross-linked polymer.

6. Method of cross-linking and curing a carboxyl-containing, rubbery polymer of a conjugated diene and an ethylenically unsaturated monomer, including contacting the polymer with a polyvalent metal oxide, and sulfur-curing the cross-linked polymer.

7. Method of cross-linking and curing a carboxyl-containing, rubbery polymer of a conjugated diene and an ethylenically unsaturated monomer, including contacting the polymer with a polyvalent metal salt of a weak acid, and sulfur-curing the cross-linked polymer.

8. A sulfur vulcanized cross-linked rubbery copolymer of butadiene-1,3 and methacrylic acid, some of the carboxyl groups of which are ionically cross-linked by zinc ions.

9. A sulfur vulcanized cross-linked rubbery copolymer of butadiene-1,3 and methacrylic acid, some of the carboxyl groups of which are ionically cross-linked by calcium ions.

10. A sulfur vulcanized cross-linked rubbery copolymer of butadiene-1,3 and methacrylic acid, some of the carboxyl groups of which are ionically cross-linked by diethylenetriamine.

11. Method of cross-linking and curing a rubbery copolymer of butadiene and methacrylic acid, including contacting the copolymer with a zinc salt of a lower fatty acid, and sulfur-curing the cross-linked product.

12. Method of cross-linking and curing a rubbery copolymer of butadiene and methacrylic acid, including contacting the copolymer with lead silicate, and sulfur-curing the cross-linked product.

13. Method of cross-linking and curing a plastic, rubbery copolymer of butadiene-1,3 and methacrylic acid, including contacting the polymer with a polyfunctional reagent of the group consisting of polyvalent metal oxides, polyvalent metal hydroxides, polyvalent metal salts of weak acids, polyamines and polyamine salts of weak acids, and sulfur-curing the cross-linked polymer.

14. A sulfur-vulcanized cross-linked rubbery copolymer of butadiene-1,3 and methacrylic acid, some of the carboxylic groups of which are ionically cross-linked by a polyfunctional reagent of the group consisting of polyvalent metal oxides, polyvalent metal hydroxides, polyvalent metal salts of weak acids, polyamines and polyamine salts of weak acids.

15. A sulfur-vulcanized cross-linked rubbery copolymer of butadiene-1,3, styrene and methacrylic acid, some of the carboxylic groups of which are ionically cross-linked by a polyfunctional reagent of the group consisting of polyvalent metal oxides, polyvalent metal hydroxides, polyvalent metal salts of weak acids, polyamines and polyamine salts of weak acids.

16. A sulfur-vulcanized cross-linked rubbery copolymer of butadiene-1,3 and acrylic acid, some of the carboxylic groups of which are ionically cross-linked by a polyfunctional reagent of the group consisting of polyvalent metal oxides, polyvalent metal hydroxides, polyvalent metal salts of weak acids, polyamines and polyamine salts of weak acids.

17. Method of cross-linking and curing a carboxyl-containing, rubbery polymer of a conjugated diene and an ethylenically unsaturated monomer, including contacting the polymer with a polyvalent metal hydroxide, and sulfur-curing the cross-linked polymer.

18. Method of cross-linking and curing a carboxyl-containing, rubbery polymer of isoprene and methacrylic acid, including contacting the polymer with a polyfunctional reagent of the group consisting of polyvalent metal oxides, polyvalent metal hydroxides, polyvalent metal salts of weak acids, polyamines and polyamine salts of weak acids, and sulfur-curing the cross-linked polymer.

19. Method of cross-linking and curing a carboxyl-containing, rubbery polymer of butadiene-1,3 and p-vinyl benzoic acid, including contacting the polymer with a polyfunctional reagent of the group consisting of polyvalent metal oxides, polyvalent metal hydroxides, polyvalent metal salts of weak acids, polyamines and polyamine salts of weak acids, and sulfur-curing the cross-linked polymer.

20. Method of cross-linking and curing a carboxyl-containing, rubbery polymer of butadiene-1,3, acrylonitrile and methacrylic acid, including contacting the polymer with a polyfunctional reagent of the group consisting of polyvalent metal oxides, polyvalent metal hydroxides, polyvalent metal salts of weak acids, polyamines and polyamine salts of weak acids, and sulfur-curing the cross-linked polymer.

References Cited in the file of this patent

UNITED STATES PATENTS

| | | |
|---|---|---|
| 2,395,505 | Sarbach | Feb. 26, 1941 |
| 2,395,506 | Sauser | Feb. 26, 1941 |
| 2,604,668 | Miller et al. | July 29, 1952 |
| 2,669,550 | Brown | Feb. 16, 1954 |

UNITED STATES PATENT OFFICE
CERTIFICATE OF CORRECTION

Patent No. 2,849,426            August 26, 1958

Verle A. Miller

It is hereby certified that error appears in the printed specification of the above numbered patent requiring correction and that the said Letters Patent should read as corrected below.

Column 4, line 34, after "small amounts of" insert -- free --; column 10, line 37, claim 8, line 41, claim 9, and line 45, claim 10, for "A sulfur vulcanized", each occurrence, read -- A sulfur-vulcanized --.

Signed and sealed this 20th day of September 1960.

(SEAL)
Attest:

KARL H. AXLINE
Attesting Officer

ROBERT C. WATSON
Commissioner of Patents